US010459276B2

(12) United States Patent
Hong et al.

(10) Patent No.: US 10,459,276 B2
(45) Date of Patent: Oct. 29, 2019

(54) LIQUID CRYSTAL DISPLAY INCLUDING BLACK COLUMN SPACER AND MANUFACTURING METHOD OF THE SAME

(71) Applicant: Samsung Display Co., Ltd., Yongin (KR)

(72) Inventors: Ki Pyo Hong, Hwaseong-si (KR); Jun Seok Lee, Seoul (KR); Sang Woo Whangbo, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 131 days.

(21) Appl. No.: 14/806,881

(22) Filed: Jul. 23, 2015

(65) Prior Publication Data

US 2016/0231617 A1    Aug. 11, 2016

(30) Foreign Application Priority Data

Feb. 9, 2015  (KR) ......................... 10-2015-0019677

(51) Int. Cl.
*G02F 1/1335* (2006.01)
*G02F 1/1339* (2006.01)
*G02F 1/1362* (2006.01)

(52) U.S. Cl.
CPC .... *G02F 1/133514* (2013.01); *G02F 1/13394* (2013.01); *G02F 1/133512* (2013.01); *G02F 1/133516* (2013.01); *G02F 2001/13398* (2013.01); *G02F 2001/136218* (2013.01); *G02F 2001/136222* (2013.01)

(58) Field of Classification Search
CPC combination set(s) only.
See application file for complete search history.

(56) References Cited

U.S. PATENT DOCUMENTS

| 7,247,411 | B2 | 7/2007 | Song | |
|---|---|---|---|---|
| 2002/0171800 | A1* | 11/2002 | Miyazaki | G02F 1/13394 349/156 |
| 2004/0227891 | A1* | 11/2004 | Hirota | G02F 1/133753 349/141 |
| 2006/0232529 | A1* | 10/2006 | Midorikawa | G02F 1/133514 345/87 |

(Continued)

FOREIGN PATENT DOCUMENTS

| KR | 10-2007-0105457 | 10/2007 |
|---|---|---|
| KR | 10-2011-0027986 | 3/2011 |
| KR | 10-2014-0023710 | 2/2014 |

*Primary Examiner* — Lauren Nguyen
(74) *Attorney, Agent, or Firm* — H.C. Park & Associates, PLC

(57) ABSTRACT

A liquid crystal display includes a first substrate including a light transmitting area and a light blocking area, a gate conductor configured to transfer gate signals and a data conductor configured to transfer data voltages, the gate conductor and the data conductor disposed on the first substrate, a color filter disposed on the gate conductor, a black column spacer disposed on the color filter and corresponding to the light blocking area, a second substrate facing the first substrate, and a liquid crystal layer disposed between the first substrate and the second substrate, in which in the light blocking area, the color filter includes a step, the black column spacer overlaps the color filter including the step, and the black column spacer includes spacers having the same thickness.

8 Claims, 7 Drawing Sheets

(56) References Cited

U.S. PATENT DOCUMENTS

2008/0185587 A1* 8/2008 Whangbo ............. G02F 1/1333
257/59
2010/0245699 A1* 9/2010 Gotoh ................. H01L 27/1288
349/46
2013/0329155 A1* 12/2013 Kwak .................... G02F 1/136
349/43

* cited by examiner

LIQUID CRYSTAL DISPLAY INCLUDING BLACK COLUMN SPACER AND MANUFACTURING METHOD OF THE SAME

CROSS-REFERENCE TO RELATED APPLICATION

This application claims priority from and the benefit of Korean Patent Application No. 10-2015-0019677, filed on Feb. 9, 2015, which is hereby incorporated by reference for all purposes as if fully set forth herein.

BACKGROUND

Field

Exemplary embodiments of the present invention relate to a liquid crystal display and a manufacturing method of the same, and more particularly, to a liquid crystal display and a manufacturing method of the same that may prevent overdevelopment of a light blocking member generated outside a display area, due to a use of a full tone mask, and design constraints, due to a use of a half tone mask, by improving a black column spacer (BCS) material.

Discussion of the Background

A liquid crystal display, among flat panel displays, may include two display panels with electrodes and a liquid crystal layer disposed therebetween. The liquid crystal display may be a display device that re-arranges liquid crystal molecules of the liquid crystal layer by applying a voltage to the electrodes to control an amount of transmitted light.

In the liquid crystal display, field generating electrodes may be provided on each of the two display panels. One display panel may include thin-film transistors and pixel electrodes arranged in a matrix form (hereinafter, referred to as a "thin-film transistor array panel"), the other display panel may include red, green, and blue color filters (hereinafter, referred to as a "common electrode panel"), and a common electrode may cover the entire surface of the common electrode panel.

However, in the liquid crystal display, since the pixel electrodes and the color filters are formed on different display panels, accurate alignment may be difficult between the pixel electrodes and the color filters. In order to prevent generation of an alignment error, a color filter-on-array (COA) structure, in which the color filter and the pixel electrode are formed on the same display panel, has been studied.

When the thin-film transistor array panel and the common electrode panel are assembled to be combined with each other, a black column spacer, such as a black matrix, may be manufactured to be larger than a predetermined size, due to an assembling margin. Since an aperture ratio may be decreased by the increased size of the black column spacer, the black column spacer may be formed on the thin-film transistor array panel.

A gap of liquid crystal layers between the two display panels may be referred to as a display area gap, and the display area gap may affect overall operational characteristics of the liquid crystal display, such as a response speed, a contrast ratio, a viewing angle, and luminance uniformity. If the display area gap is not uniform, a uniform image may not be displayed over the entire screen and deteriorate image quality. Accordingly, spacers may be formed at one of the two substrates to maintain the uniform display area gap over the entire area of the substrate. The spacers may include a main column spacer supporting two substrates and a sub-column spacer supporting the main column spacer.

In order to simplify a manufacturing process, the black column spacer such as the black matrix and the spacers may be simultaneously formed as the black column spacer. When the black column spacer includes the black column spacer, the main column spacer, and the sub-column spacer, multiple steps may be required to implement the black column spacer. To implement the multi-steps, a mask that may implement multi-transmittance and a material that may implement the multi-steps may be required.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a liquid crystal display and a manufacturing method of the same that prevent overdevelopment of a light blocking member generated at an outer edge of a display area, by improving a black column spacer material such that stability of the material due to a use of a full tone mask may be improved.

Exemplary embodiment of the present invention also provide a liquid crystal display and a manufacturing method of the same that prevent design constraints from a use of a half tone mask by improving a black column spacer.

Additional aspects will be set forth in the detailed description which follows, and, in part, will be apparent from the disclosure, or may be learned by practice of the inventive concept.

According to an exemplary embodiment of the present invention, a liquid crystal display includes a first substrate including a light transmitting area and a light blocking area, a gate conductor configured to transfer gate signals and a data conductor configured to transfer data voltages, the gate conductor and the data conductor disposed on the first substrate, a color filter disposed on the gate conductor, a black column spacer disposed on the color filter and corresponding to the light blocking area, a second substrate facing the first substrate, and a liquid crystal layer disposed between the first substrate and the second substrate, in which in the light blocking area, the color filter includes a step, the black column spacer overlaps the color filter including the step, and the black column spacer includes spacers having the same thickness.

According to an exemplary embodiment of the present invention, a method of manufacturing a liquid crystal display includes forming a gate conductor by laminating and patterning a conductive material on a first substrate including a light transmitting area and a light blocking area, coating a color filter material on the gate conductor, forming a color filter pattern on the coated color filter material by using a first optical mask including regions of different transmittances, coating a black column spacer material on the color filter pattern, and forming a black column spacer by using a second optical mask having one full tone transmittance, such that a light blocking member and a spacer configured to maintain a gap between liquid crystal layers are simultaneously formed.

According to exemplary embodiments of the present invention, a pattern may be formed by using only a full tone mask without using a half tone mask in light blocking member region of a black column spacer, which may cause overdevelopment at an outer edge of a display area. A step is formed as a protruding pattern by using the full tone and a half tone of an optical mask in a color filter, such that the step may be formed between first and second spacers and a light blocking member, even when the black column spacer is formed with the full tone optical mask.

According to exemplary embodiments of the present invention, since the black column spacer exposed by using the full tone mask is not sensitive to a concentration of a developer, it may be possible to prevent overdevelopment at the outer edge of the display area. Further, since the color filter using the half tone mask may not have pattern as the black column spacer at the edge of the display area, an influence from a difference in concentration of the developer between the center and the edge of the display area according to a pattern density may be reduced.

According to exemplary embodiments of the present invention, overdevelopment of the light blocking member of the black column spacer generated at the outer edge of the display area may be prevented by improving the black column spacer material, which may improve stability of a material from a use of the half tone mask. Further, the black column spacer formed by using the half tone mask according to the exemplary embodiments of the present invention may reduce design constraints from use of the half tone mask.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept

DETAILED DESCRIPTION OF THE ILLUSTRATED EMBODIMENTS

Figure 1:
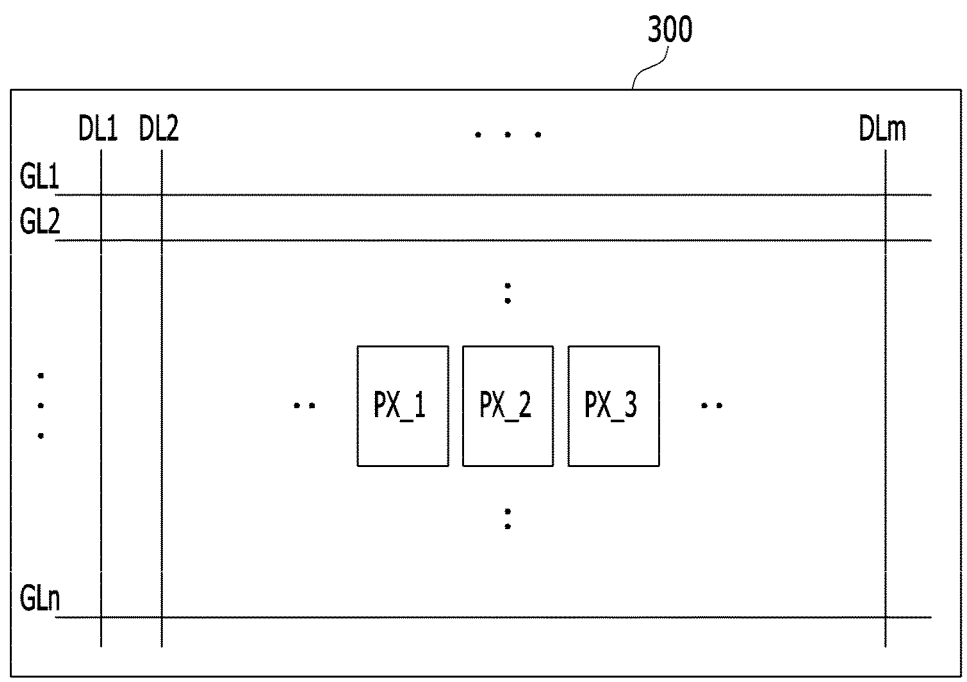
FIG. 1 is a schematic plan view of a liquid crystal display according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a structure of a liquid crystal display according to an exemplary embodiment of the present invention will be described with reference to FIGS. 1 and 2.

Referring to FIG. 1, a liquid crystal display 300 according to the present exemplary embodiment may include lower and upper substrates (not illustrated) facing each other and a liquid crystal layer (not illustrated) interposed between the two substrates.

Signal lines include gate lines (GL1-GLn) transferring gate signals and data lines (DL1-DLm) transferring data voltages.

One pixel PX may include at least one switching element Q (not illustrated) connected to at least one data line DLj (j=1, 2, . . . m) and at least one gate line GLi (i=1, 2, . . . , n), and at least one pixel electrode (not illustrated) connected thereto. The switching element Q may include at least one thin-film transistor, and is controlled according to a gate signal transferred by the gate line GLi, to transfer data voltage transferred by the data line DLj to the pixel electrode.

Pixels PX may include a first color pixel PX_1, a second color pixel PX_2, and a third color pixel PX_3, which represent different primary colors, and further include pixels which may represent colors other than the first to third colors or gray-based colors, such as white.

The first color, the second color, and the third color may be three primary colors of red, green, and blue. The first color pixel PX_1, the second color pixel PX_2, and the third color pixel PX_3 may form one dot and implement a display with various colors by controlling luminance of the pixels PX. One dot may further include pixels representing colors other than the first color pixel PX_1, the second color pixel PX_2, and the third color pixel PX_3.

Figure 2:
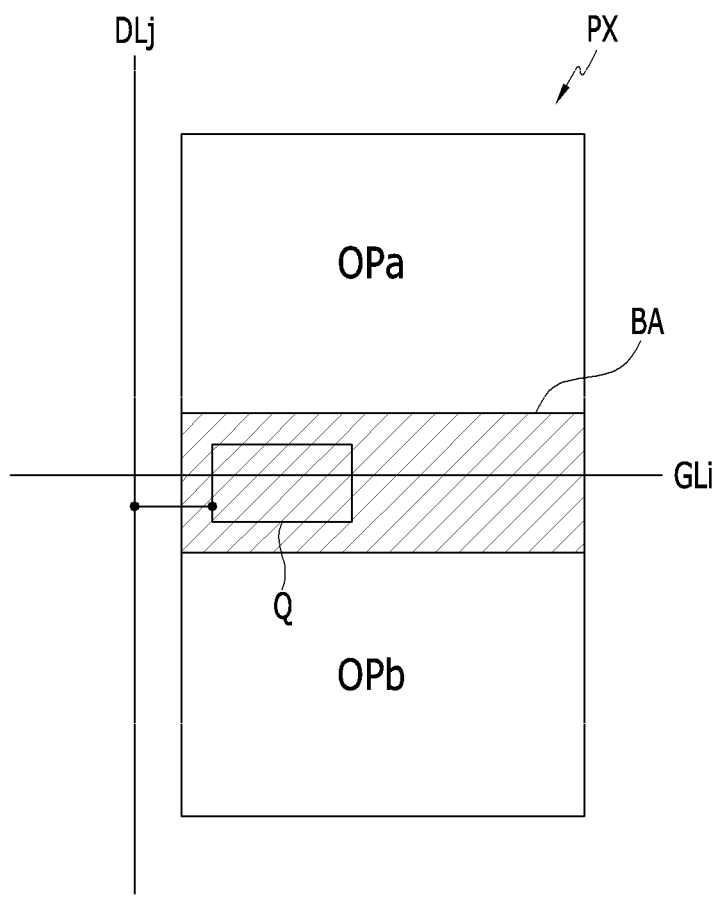
FIG. 2 is a schematic plan view of one pixel of the liquid crystal display of FIG. 1.

Referring to FIG. 2, one pixel PX may include at least one light blocking area BA and one or more light transmitting areas OPa and OPb. One pixel PX may include first and second light transmitting areas OPa and OPb adjacent to each other and a light blocking area BA positioned therebetween. The first and second light transmitting areas OPa and OPb may be a display area in which most of the image is displayed and transmit light, and the light blocking area BA may not display the image and may not transmit light in the most of the light blocking area BA.

One pixel PX of the liquid crystal display according to the present exemplary embodiment may include subpixels. Different subpixels of one pixel PX may display an image according different gamma curves with respect to one image signal and display an image according to the same gamma curve. Referring to FIG. 2, the first light transmitting area OPa may be a light transmitting area of one subpixel and the second light transmitting area OPb may be a light transmitting area of another subpixel. The gate line GLi, the switching element Q, and the like may be positioned in the light blocking area BA.

In a manufacturing method of the liquid crystal display according to the present exemplary embodiment, a light blocking member is formed in the light blocking area BA by using a full tone (a region where transmittance is substantially 100%) of an optical mask and a spacer is formed by using a step of the color filter positioned below the light blocking member. Accordingly, use of one mask may be reduced, which may reduce one photoresist process and manufacturing costs, and improve process efficiency.

The black column spacer may include a black column spacer formed along the gate line GLi. The black column spacer may be formed to correspond to a transparent region of the optical mask. Forming a black column spacer along the data line DLj may make it difficult to implement high resolution that includes a narrow pattern, and thus light may be blocked by using a shielding common electrode 190 (illustrated in FIG. 3).

Figure 3:
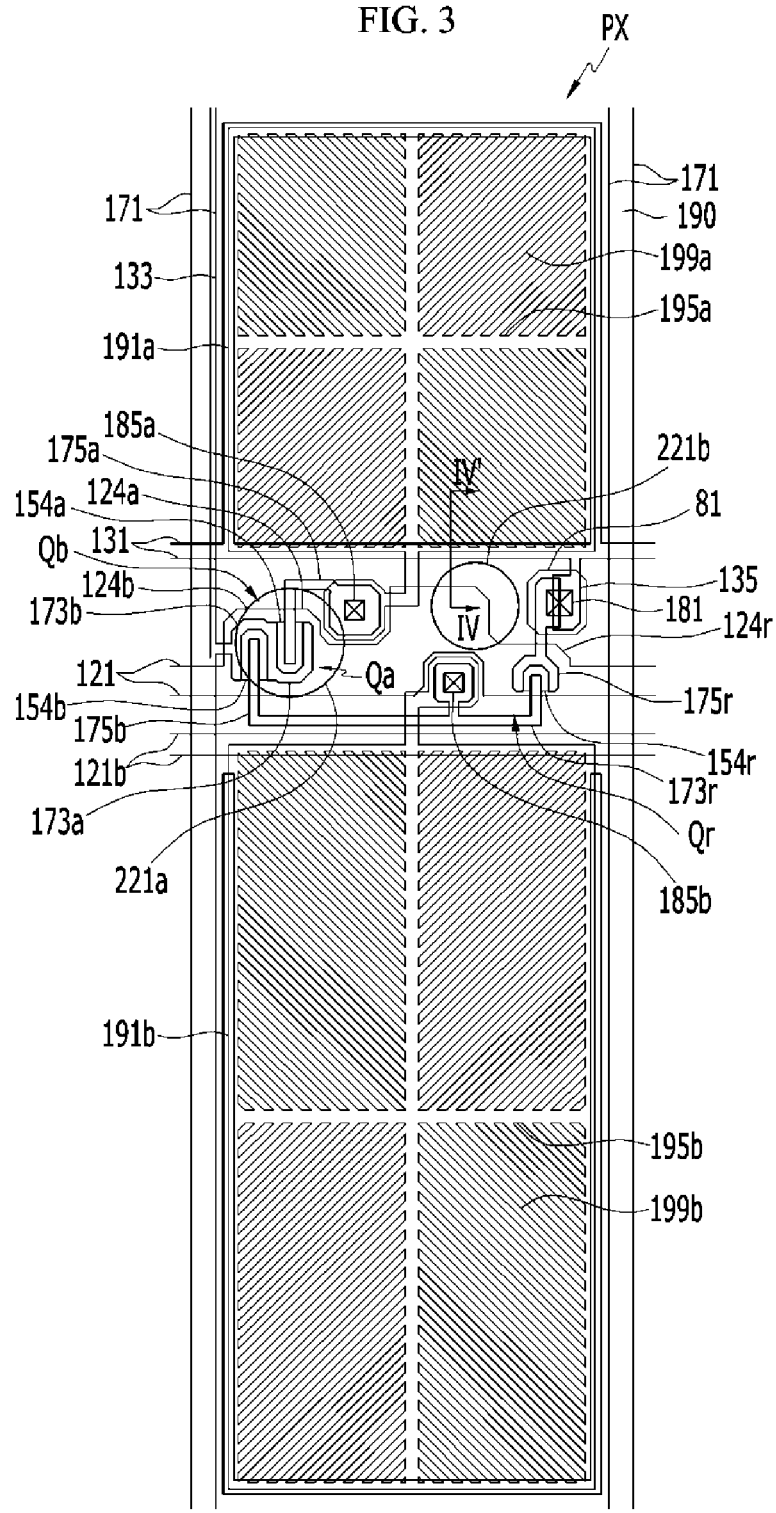
FIG. 3 is a layout view of one pixel of a liquid crystal display according to an exemplary embodiment of the present invention.
Figure 4:
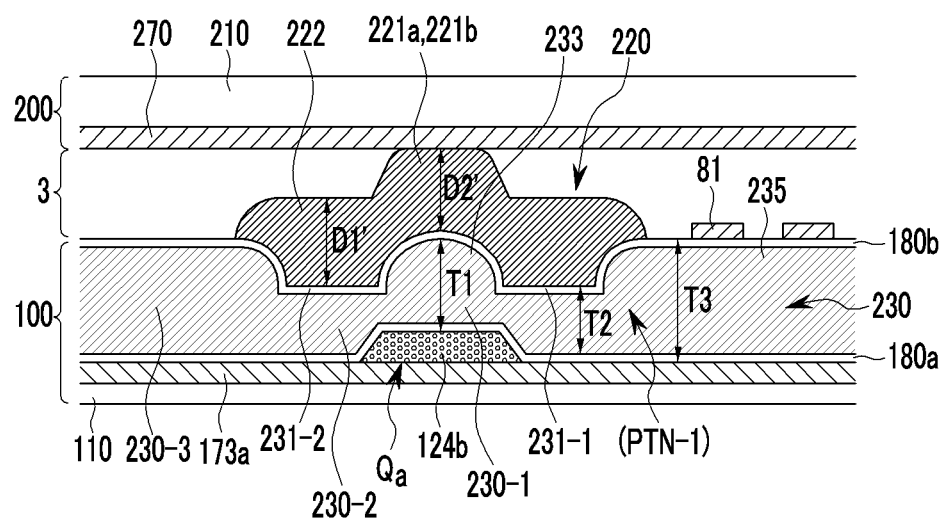
FIG. 4 is a cross-sectional view of the liquid crystal display illustrated in FIG. 3, taken along line IV-IV'.

Referring to FIGS. 3 and 4, the shielding common electrode 190 may be formed to correspond to a source line. The shielding common electrode 190 may be formed on the same layer as a pixel electrode. The shielding common electrode 190 is formed on the source line and forms a capacitance with the source line, to shield a voltage applied to the source line and prevent a coupling phenomenon of the pixel electrode and the source line. The shielding common electrode 190 may be applied with the same common voltage applied to a common electrode 270 formed on an upper panel 200. Accordingly, liquid crystal molecules interposed between the shielding common electrode 190, the source line, and the gate lines GLi may be aligned to block incident light. Thus, by using the shielding common electrode 190, forming a separate light blocking pattern may not be required, which may cause difficulty in achieving high resolution in a narrow pattern when the black column spacer is formed along the data line DLj.

The black column spacer 220 according to the present exemplary embodiment may not require a protruding pattern PTN formed on the upper panel 200, and thus may prevent misalignment of the upper panel 200 and a lower panel 100. Accordingly, the black column spacer 220 according to the present exemplary embodiment may be applied to a curved panel without a panel defect due to the misalignment of the upper panel 200 and the lower panel 100, and since a seal of the upper panel 200 may be cured by exposing the upper panel 200 to an electric field, it may be possible to prevent the seal from being uncured, improve contrast ratio (CR), and decrease light leakage at the edge of the display panel.

When a spacer is formed by using the full tone of the optical mask along the gate line and reducing transmittance of a portion of the optical mask to form a light blocking member with a half tone optical mask, the light blocking member formed with the half tone may not be sufficiently cured by light. Accordingly, a critical dimension (CD) and a thickness of the light blocking member may vary according to developing time and condition after exposure, and a step of the black column spacer may be formed by using incompleteness of curing. However, when a black column spacer of a light blocking region around the edge of the display area or an active region of the center of the display area is formed by using the full tone of the optical mask, almost no portion of the black column spacer may be melted out, and as a result, a concentration of a developer around the black column spacer may be high and overdevelopment may be caused toward the edge of the display area. Due to the overdevelopment, the CD and the thickness of the light blocking member of the black column spacer may be smaller than normal CD and thickness, and may generate partial tearing of the light blocking member.

For example, in a 48" inch liquid crystal display using the black column spacer, overdevelopment may be large in left and right regions, but the overdevelopment may not be generated in upper, middle, and lower sides. The reason may be that a region of the black column spacer formed by the half tone optical mask widely exists at the lower side and a concentration of the developer is set to a level of the center of the display area in developing the black column spacer, but since the black column spacer almost may not be developed in the left and right regions outside the display area, which is directly adjacent to the region of the black column spacer formed by using the full tone optical mask, the concentration of the developer may be relatively high, and as a result, overdevelopment may occur in the black column spacers in the left and right regions.

Accordingly, in order to prevent overdevelopment of the light blocking member outside the display area, the black column spacer may be designed to have a thickness of about 800 μm or more by the half tone optical mask to be adjacent to the active region, similarly to the lower side of the 48" inch display device. However, since light blocking ability of the black column spacer formed by using the half tone optical mask may be insufficient as compared with the black column spacer formed by using the full tone optical mask, light of a partial area needs to be blocked with metal by adding a blue layer to the lower portion and thus applying the black column spacer to a general liquid crystal display including a narrow bezel may be limited.

Hereinafter, the liquid crystal display and a manufacturing method of the same according to an exemplary embodiment of the present invention that may prevent overdevelopment of the light blocking member caused at an outer edge of the display area while forming the black column spacer by using the full tone optical mask will be described with reference to FIGS. 3 to 5.

Figure 5:
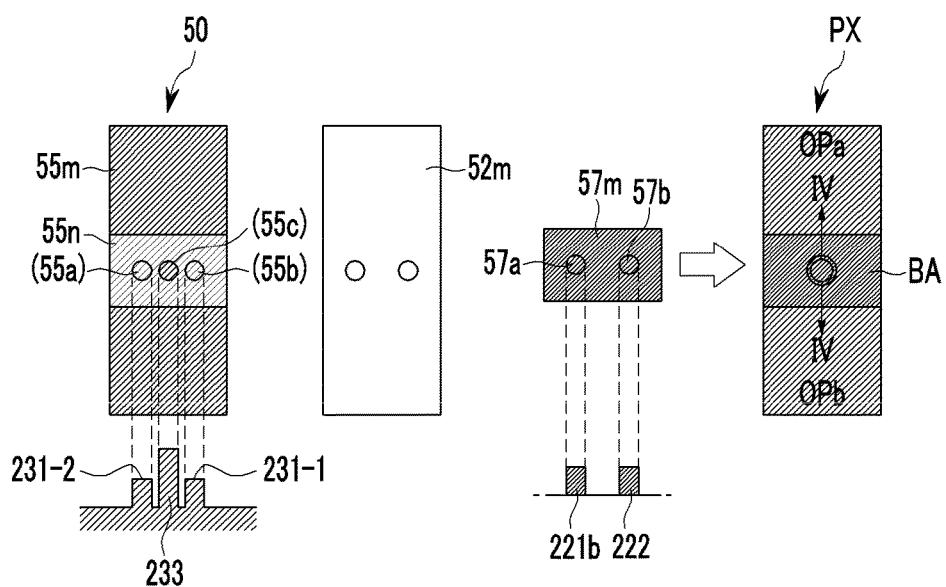
FIG. 5 is a diagram illustrating a plan view of an optical mask for forming a black column spacer of the liquid crystal display according to an exemplary embodiment of the present invention and a schematic cross-sectional view of a black column spacer corresponding to the optical mask.

FIG. 3 is a layout view of one pixel of a liquid crystal display according to an exemplary embodiment of the present invention, FIG. 4 is a cross-sectional view of the liquid crystal display illustrated in FIG. 3, taken along line IV-IV', and FIG. 5 is a diagram illustrating a plan view of an optical mask for forming a black column spacer of the liquid crystal display according to the present exemplary embodiment and a schematic cross-sectional view of a black column spacer corresponding to the optical mask.

The liquid crystal display according to the present exemplary embodiment includes a lower panel 100 and an upper panel 200 facing each other, and a liquid crystal layer 3 interposed between the lower and upper panels 100 and 200.

In the lower panel 100, a gate conductor including gate lines 121 and a reference voltage line 131 is positioned on a substrate 110.

The gate line 121 substantially extends in a horizontal direction and includes a first gate electrode 124a, a second gate electrode 124b, and a third gate electrode 124r which protrude in a vertical direction.

The reference voltage line 131 is spaced apart from the gate line 121 and may substantially extend in a horizontal direction. The reference voltage line 131 may transfer a reference voltage, which may be an AC voltage or a predetermined DC voltage such as a common voltage Vcom. The reference voltage line 131 may include a protrusion 135 protruding upward or downward from the portion extending in the horizontal direction.

A gate insulating layer is positioned on the gate conductor, and a semiconductor layer including a first semiconductor 154a, a second semiconductor 154b, and a third semiconductor 154r is positioned thereon. The first semiconductor 154a and the second semiconductor 154b may be connected with each other. The first semiconductor 154a may overlap with the first gate electrode 124a, the second semiconductor 154b may overlap with the second gate electrode 124b, and the third semiconductor 154r may overlap with the third gate electrode 124r. The semiconductor layer may include amorphous silicon, polycrystalline silicon, metal oxide, or the like.

Ohmic contacts including silicide or a material such as n+ hydrogenated amorphous silicon, in which an n-type impurity is doped at a high concentration, may be positioned on the semiconductor layer. The ohmic contacts may be omitted.

A data conductor including data lines 171 including a first source electrode 173a, a second source electrode 173b, and a third source electrode 173r, a first drain electrode 175a, a second drain electrode 175b, and a third drain electrode 175r are positioned on the ohmic contacts and the gate insulating layer. The data line 171 transfers a data signal and substantially extends in a vertical direction to cross the gate line 121 and the reference voltage line 131.

The first source electrode 173a protrudes toward the first gate electrode 124a from the data line 171 to face the first drain electrode 175a, and the second source electrode 173b protrudes toward the second gate electrode 124b from the data line 171 to face the second source electrode 173b. The first source electrode 173a and the second source electrode 173b are connected with each other, and the second drain electrode 175b and the third source electrode 173r are connected with each other. The third source electrode 173r and the third drain electrode 175r face each other. One end portion which does not face the third source electrode 173r among end portions of the third drain electrode 175r may be adjacent to or overlap with a part of the protrusion 135 of the reference voltage line 131.

The first gate electrode 124a, the first source electrode 173a, and the first drain electrode 175a form a first thin-film transistor Qa together with the first semiconductor 154a as a first switching element, the second gate electrode 124b, the second source electrode 173d, and the second drain electrode 175b form a second thin-film transistor Qb together with the second semiconductor 154b as a second switching element, and the third gate electrode 124r, the third source electrode 173r, and the third drain electrode 175r form a third thin-film transistor Qr together with the third semiconductor 154r as a divided voltage switching element.

Channels of the first thin-film transistor Qa, the second thin-film transistor Qb, and the third thin-film transistor Qr each are formed in the first, second, third semiconductors 154a, 154b, and 154r between the first, second, third source electrodes 173a, 173b, and 173r and the first, second, third drain electrodes 175a, 175b, and 175r. The gate line 121, the reference voltage line 131, and the first to third thin-film transistors Qa, Qb, and Qr may be positioned in the light blocking area BA illustrated in FIG. 2 described above. The configuration of the light blocking area BA included in one pixel PX may vary including at least one thin-film transistor.

A first insulating layer 180a is positioned on the data conductor and the exposed semiconductor portion. The first insulating layer 180a may include an organic insulating material or an inorganic insulating material, and may include a single layer or a multilayer.

A color filter 230 may be positioned on the first insulating layer 180a. The color filter 230 may display one of the primary colors such as three primary colors of red, green and blue. The color filter 230 may also display one of cyan, magenta, yellow, and white-based primary colors.

According to the present exemplary embodiment, the color filters 230 are disposed on the light blocking area BA, in addition to the light transmitting areas OPa and OPb at the center of one display area. The color filters 230 may include a stripe pattern PTN-1, in which a step is formed by varying a thickness T3 of a third color filter 230-3 of the light transmitting area OPa and OPb and thicknesses T1 and T2 of first and second color filters 230-1 and 230-2 of the light blocking area BA disposed outside the light transmitting areas OPa and OPb.

The stripe pattern PTN-1 of the color filter 230 has concave portions corresponding to the light blocking member 222, and may have concave portions 231-1 and 231-2 having the thickness T2 of the second color filter 230-2 from the lower substrate 110, a convex portion 233 protruding by the thickness T1 of the first color filter 230-1 upward from the concave portions 231-1 and 231-2 in a hemispherical shape, and a flat portion 235 having the thickness T3 of the third color filter 230-3 so as to have the same height as the height of the highest point of the convex portion 233 and having a round edge to correspond to the display area.

In the stripe pattern PTN-1 of the color filter 230, a first concave portion 231-1 and a second concave portion 231-2 are formed in two directions based on the convex portion and thus a double step may be formed in the light blocking area BA. More particularly, the thickness T1 of the first color filter 230-1 of the convex portion 233 is larger than the thickness T2 of the second color filter 230-2 of the first concave portion 231-1 and the second concave portion 231-2 formed at both sides of the convex portion to form a double step based on the convex portion.

The thickness T1 of the first color filter 230-1 of the convex portion 233 may be formed so as to have almost no step from the thickness T3 of the third color filter 230-3 of the flat portion 235. A difference between the thickness T1 of the first color filter 230-1 of the convex portion 233 and the thickness T3 of the third color filter 230-3 of the flat portion 235 is preferably within 1.0 μm. Further, the thickness T1 of the first color filter 230-1 of the convex portion 233 may be formed to be larger than the thickness T2 of the second color filter 230-2 of the first and second concave portions 231-1 and 231-2 by approximately 0.5 to 2.5 μm.

As such, the step may be formed by the stripe pattern PTN-1 of the color filter 230 between the light blocking member 222 of the black column spacer 220 and the first or second spacer 221a or 221b, even though the black column spacer 220 is formed on the color filter 230 by using the full tone of the optical mask, because the pattern is not formed in the first and second concave portions 231-1 and 231-2 as the black column spacer 220.

Further, even though the black column spacer 220 with a predetermined thickness is formed on the stripe pattern PTN-1 of the color filter 230, the black column spacer 220 may not be sensitive to a concentration of the developer, and thus the overdevelopment may not be generated at the edge of the display area. Even though the first color filter 230-1 is formed by using the half tone optical mask, as there is no black column spacer 220 in a horizontal direction at the edge of the display area, an influence to the first color filter 230-1 by a difference in concentration of the developer between the center and the edge of the display area may be less, according to a pattern density.

A second insulating layer 180b may be positioned on the color filter 230. The second insulating layer 180b may include an organic insulating material. The second insulating layer 180b as an overcoat for the color filter 230 may prevent the color filter 230 from being exposed and provide a flat surface. The second insulating layer 180b may prevent impurity such as a pigment of the color filter 230 from flowing into the liquid crystal layer 3. The second insulating layer 180b may be omitted.

The gate insulating layer and the first and second insulating layers 180a and 180b may further include a contact hole 181 exposing a part of the third drain electrode 175r and a part of the protrusion 135 of the reference voltage line 131. Pixel electrodes and contact assistants 81 are positioned on the second insulating layer 180b.

One pixel electrode may be configured by one electrode and may include subpixel electrodes. In the present exemplary embodiment, one pixel electrode includes a first subpixel electrode 191a and a second subpixel electrode 191b. Most of the first subpixel electrodes 191a may be positioned in the first light transmitting area OPa illustrated in FIG. 2 described above, and most of the second subpixel electrode 191b may be positioned in the second light transmitting area OPb. The overall shape of each of the first subpixel electrode 191a and the second subpixel electrode 191b may be a quadrangle. The first subpixel electrode 191a and the second subpixel electrode 191b may include cross stems 195a and 195b including horizontal stems and vertical stems, and minute branches 199a and 199b extending outward from the cross stems 195a and 195b, respectively.

The first subpixel electrode 191a and/or the second subpixel electrode 191b are divided into domains by the cross stems 195a and 195b. The minute branches 199a and 199b extend obliquely from the cross stems 195a and 195b and may form an angle of approximately 45° or 135° with the gate line 121. The extending directions of the minute branches 199a and 199b of the adjacent domains are different from each other, for example, may be orthogonal to each other. The first subpixel electrode 191a and the second subpixel electrode 191b are physically and electrically connected with the first drain electrode 175a and the second drain electrode 175b through contact holes 185a and 185b, respectively. The first subpixel electrode 191a may receive a data voltage from the first drain electrode 175a, and the second subpixel electrode 191b may receive a divided voltage between the data voltage transferred through the second drain electrode 175b and the reference voltage transferred by the reference voltage line 131.

The third drain electrode 175r and the protrusion 135 of the reference voltage line 131 may be connected with each other through the contact assistants 81 in the contact hole 181. The first subpixel electrode 191a, the second subpixel electrode 191b, and the contact assistants 81 may include a transparent conductive material such as indium tin oxide (ITO), indium zinc oxide (IZO), and a metal thin film. The layout and the form of the pixel PX, the structure of the thin-film transistor, and the shape of the pixel electrode may vary.

The black column spacer 220 positioned in the light blocking area BA of the pixel PX includes a light blocking member 222 and a first spacer 221*a* or a second spacer 221*b*. Most of the light blocking member 222 is positioned in the light blocking area BA where the first to third thin-film transistors Qa, Qb, and Qr are positioned, and may have a substantially flat upper surface. The light blocking member 222 may prevent light leakage between the first light transmitting area OPa where the first subpixel electrode 191*a* is positioned and the second light transmitting area OPb where the second subpixel electrode 191*b* is positioned.

A thickness D1 of the light blocking member 222 may be approximately 1 μm to 2.5 μm, and more particularly, may be approximately 2 μm. The first spacer 221*a* or the second spacer 221*b* is spaced apart from each other and connected to the light blocking member 222. The first spacer 221*a* and the second spacer 221*b* may be positioned on the first to third thin-film transistors Qa, Qb, and Qr and/or the signal lines such as the reference voltage line 131 and the data line 171.

The first spacer 221*a* may be positioned on the first and second thin-film transistors Qa and Qb, and the second spacer 221*b* may be positioned on a periphery of the thin-film transistor, that is, the outer side of the region where the thin-film transistor is positioned, such as on the gate line 121. The first spacer 221*a* and the second spacer 221*b*, as sub-spacers, may maintain and support a cell gap between the upper panel 200 and the lower panel 100 when a distance between the upper panel 200 and the lower panel 100 is decreased by external pressure in the display device.

In the present exemplary embodiment, a thickness D2 of the first to second spacer 221*a* or 221*b* may be configured to be substantially similar to the thickness D1 of the light blocking member 222 without a step. Even though one of the first and second spacers 221*a* and 221*b* is a main spacer having a higher upper surface than the other spacer and the other spacer is a sub-spacer, the thickness D2 of the first or second spacer 221*a* or 221*b* may be almost the same as the thickness D1 of the light blocking member 222.

When the thickness D1 of the light blocking member 222 from the upper surface of the first and second concave portions 231-1 and 231-2 of the color filter 230 is, for example, approximately 2 μm, the thickness D2 of the first or second spacer 221*a* or 221*b* from the upper surface of the convex portion 233 of the color filter layer 230 may be approximately 2 μm.

A width of each of the first spacer 221*a* and the second spacer 221*b* may be approximately 30 μm to 50 μm. The black column spacer 220 may include a pigment such as black carbon and include a photosensitive organic material. The main spacer may serve to maintain and support a display area gap between the upper panel 200 and the lower panel 100 in a general state. When the number of main spacers is increased, it may be difficult to control the cell gap between the upper panel 200 and the lower panel 100 to be suitable for a volume change of the liquid crystal layer 3 according to an environmental change, such as a temperature, which may generate bubbles in the liquid crystal layer 3. Accordingly, the number of main spacers may be limited.

The sub-spacer serves to assist the main spacer by maintaining the cell gap between the upper panel 200 and the lower panel 100 when external pressure is applied to the display device. When the number of sub-spacers is decreased, the main spacer may be permanently deformed and a display defect, such as spots, may be seen. Accordingly, it may be advantageous to have increased number of sub-spacers in the display device.

According to the present exemplary embodiment, when the color filter 230 and the black column spacer 220 are positioned on the lower panel 100 together with the first to third thin-film transistors Qa, Qb, and Qr, an alignment between the black column spacer 220 and the color filter 230-1, and the pixel electrode and the first to third thin-film transistors Qa, Qb, and Qr may be easily adjusted, thereby reducing an alignment error. Accordingly, it may be possible to prevent light leakage or deterioration of an aperture ratio of the display device due to misalignment between the constituent elements and increase transmittance. An alignment layer (not illustrated) is formed on the black column spacer 220, and the alignment layer may be a vertical alignment layer.

In the upper panel 200, an opposed electrode 270 may be positioned on a substrate 210. The opposed electrode 270 as a planar shape may be formed on the entire surface of the substrate 210 as a whole plate. The opposed electrode 270 may transfer a common voltage Vcom having a predetermined magnitude. The opposed electrode 270 may include a transparent conductive material such as ITO, IZO, and a metal thin film. An alignment layer is formed on the opposed electrode 270, and the alignment layer may be a vertical alignment layer.

The liquid crystal layer 3 includes liquid crystal molecules (not illustrated). The liquid crystal molecules may have negative dielectric anisotropy and may be aligned in a substantially vertical direction to the substrates 110 and 210 while an electric field is not generated in the liquid crystal layer 3. The liquid crystal molecules may form pretilts in a predetermined direction when the electric field is not generated in the liquid crystal layer 3. The liquid crystal molecules may be pretilted in a substantially parallel direction to the minute branches 199*a* and 199*b* of the first and second subpixel electrodes 191*a* and 191*b*. The first subpixel electrode 191*a* forms a first liquid crystal capacitor together with the opposed electrode 270 and the second subpixel electrode 191*b* forms a second liquid crystal capacitor together with the opposed electrode 270 to maintain the charged voltage.

Next, a manufacturing method of the liquid crystal display according to the present exemplary embodiment will be described with reference to FIG. 5 in addition to the drawings described above.

First, a gate conductor including the gate lines 121 and reference voltage lines 131*a* is formed by laminating and patterning a conductive material on the substrate 110 including glass, plastic, or the like.

Next, the gate insulating layer is formed by laminating an insulating material such as an inorganic insulating material or an organic insulating material on the gate conductor.

Next, the semiconductor layer including the first semiconductor 154*a*, the second semiconductor 154*b*, and the third semiconductor 154*r*, and the data conductor including the data lines 171, the first drain electrode 175*a*, the second drain electrode 175*b*, the third source electrode 173*r*, and the third drain electrode 175*r* are formed by sequentially laminating and patterning a semiconductor material and a conductive material on the gate insulating layer.

Next, the first insulating layer 180*a* is formed by laminating an organic insulating material or an inorganic insulating material on the data conductor and the exposed portions of the semiconductors 154*a*, 154*b*, and 154*r*.

Next, color filter materials are coated on the first insulating layer 180a to correspond to the color filter 230-1 positioned in the first color pixel PX_1, the second color filter 230-2 positioned in the second color pixel PX_2, and the third color filter 230-3 positioned in the third color pixel PX_3.

Next, as illustrated in FIG. 5, a color filter pattern PTN-1 is formed by exposing the coated color filter material by using an optical mask 50.

Referring to FIG. 5, the optical mask 50 according to the present exemplary embodiment includes regions having different transmittances, and the regions may represent three different transmittances. The regions representing three transmittances may include a transparent region transmitting all light, a half tone region transmitting only a part of the light, and an opaque region having the lowest transmittance. For example, the transparent region may transmit most of the light and have light transmittance of approximately 100%, the opaque region blocks most of the light to have light transmittance of approximately 0%, and the light transmittance of the half tone region may be, for example, approximately 19%.

When the material layer of the color filter 230 has positive photosensitivity that may disappear when the light is irradiated, the optical mask 50 for the color filter material layer may include a main region 55m, which is the opaque region corresponding to the flat portion 235 at the center of the pixel described above, half tone regions 55a and 55b corresponding to the concave portions 231-1 and 231-2 formed at both sides of the convex portion 233 at the center of the pixel, and a light blocking region 55n having an opaque region 55c corresponding to the convex portion 233.

When the color filter material layer is exposed and formed through the optical mask 50, a portion of light may pass through the half tone regions 55a and 55b to form the first and second concave portions 231-1 and 231-2, and the flat portion 235 of the display area. The convex portion 233 of the light blocking area BA may be formed through the opaque regions 55a and 55c which do not transmit light. Since the light transmittance of the opaque region 55c is the same as the light transmittance of the main region 55m, a height of the upper surface of the color filter material layer exposed through the opaque region has substantially the same height as the color filter material layer therearound. When the color filter material layer has negative photosensitivity, a transparent degree of the optical mask 50 described above may be reversely changed.

Next, the second insulating layer 180b may be formed by laminating an insulating material on the color filter material layer.

The second insulating layer 180b may also be formed by using the mask 50 having the transparent region.

A black column spacer 220 material layer is coated along the stripe pattern PTN-1 of the color filter 230. The black column spacer 220 is integrally formed by the light blocking member 222 and the first or second spacer 221a or 221b in the light blocking area BA. Accordingly, one mask for the light blocking member 222 and the first or second spacer 221a or 221b may be reduced, which may reduce one photoresist process and manufacturing costs and increase process efficiency.

The black column spacer 220 may form a pattern with only the full tone as the main region 57m corresponding to the opaque region, the opaque region 57a corresponding to the light blocking member 222, and the opaque region 57b corresponding to the first or second spacer 221a or 221b.

Accordingly, the half tone optical mask in the light blocking region BA of the black column spacer 220 causing overdevelopment may not be used at the outer edge of the display area. Since the fully exposed black column spacer 220 may not be sensitive to the concentration of the developer, the overdevelopment may not be caused at the outer edge of the display area.

More particularly, since the stripe pattern PNT_1 of the color filter 230 is step-formed as a protruding pattern by using the full tone and half tone optical masks 50, when the black column spacer 220 is formed thereon with the full tone, a step may be formed between the first or second spacer 221a or 221b and the light blocking member 222.

Subsequently, the first contact hole 185a exposing the first drain electrode 175a, the second contact hole 185b exposing the second drain electrode 175b, the contact hole 181 exposing a part of the third drain electrode 175r, and the protrusion 135 of the reference voltage line 131 are formed by patterning the gate insulating layer, the first insulating layer 180a, and the second insulating layer 180b.

Next, pixel electrodes and contact assistants 81 are formed by laminating and patterning a conductive material such as ITO and IZO on the second insulating layer 180b.

Hereinafter, a liquid crystal display and a manufacturing method thereof according to an exemplary embodiment of the present invention will be described with reference to FIGS. 6 and 7.

Figure 6:
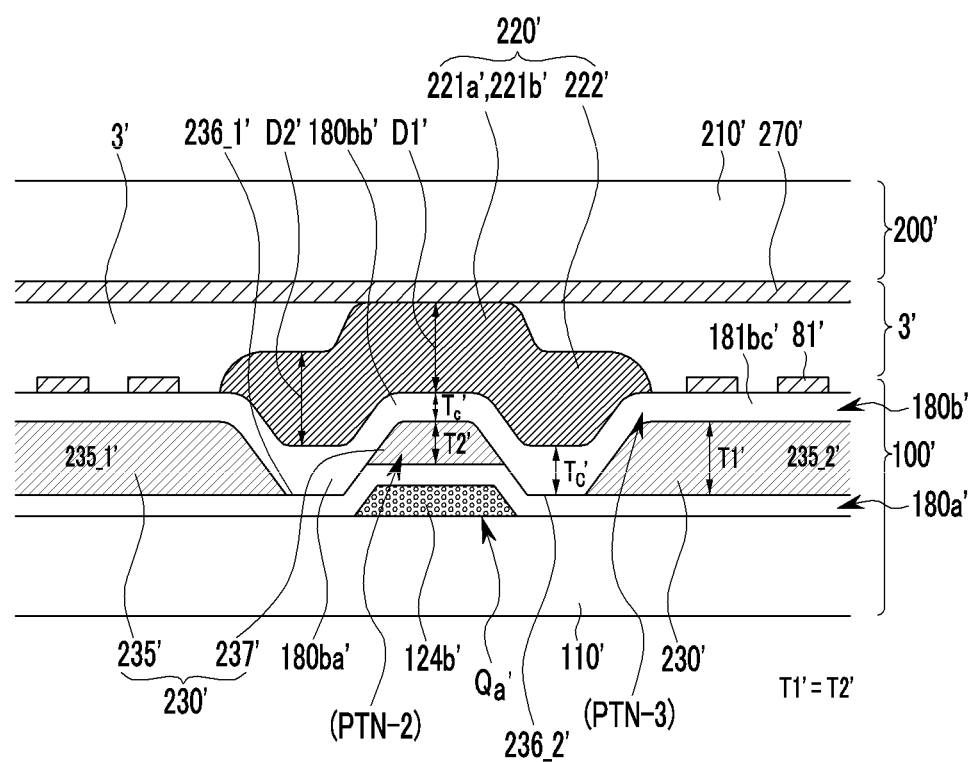
FIG. 6 is a layout view of one pixel of a liquid crystal display according to an to exemplary embodiment of the present invention.
Figure 7:
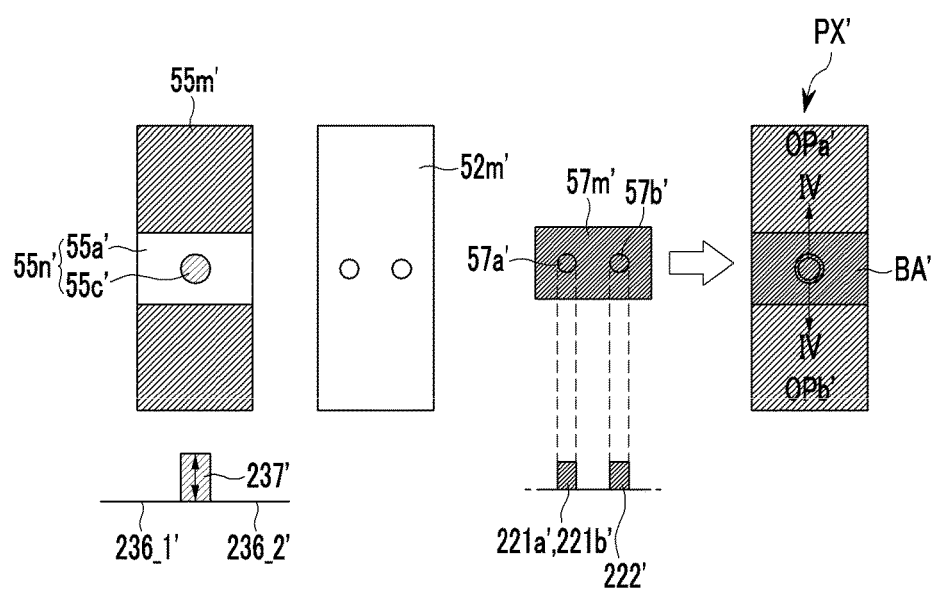
FIG. 7 is a diagram illustrating a plan view of an optical mask for forming a black column spacer of the liquid crystal display according to an exemplary embodiment of the present invention and a schematic cross-sectional view of a black column spacer corresponding to the optical mask.

FIG. 6 is a layout view of one pixel of a liquid crystal display according to the present exemplary embodiment of the present invention, and FIG. 7 is a diagram illustrating a plan view of an optical mask for forming a black column spacer of the liquid crystal display according to the present exemplary embodiment and a schematic cross-sectional view of a black column spacer corresponding to the optical mask.

In the liquid crystal display according to the present exemplary embodiment, characteristics of each layer may be substantially similar to that of the liquid crystal display illustrated with reference to FIGS. 1 to 5, and thus repeated description thereof will me omitted. Hereinafter a pattern of the color filter, a pattern of the second insulating layer on the color filter, and a black column spacer will be mainly described.

In the present exemplary embodiment, a color filter 230' is formed to have an island pattern PTN-2 in which an island portion 237' is isolated and formed on the gate conductor in a light blocking area BA' between first and second flat portions 235_1' and 235_2' corresponding to light transmitting areas OPa' and OPb' disposed at the center of one pixel PX'.

First and second grooved portions 236-1' and 236-2' are formed between the flat portion 235' and the island portion 237', and a first color filter thickness T1' of the flat portion 235' is formed to be the same as a second color filter thickness T2' of the island portion 237'.

A second insulating layer 180b' is further positioned on the color filter 230', and the second insulating layer 180b' is formed as an organic layer and includes an organic layer stripe pattern PTN-3. The organic layer stripe pattern PTN-3 formed on the color filter 230' includes a thin film portion 180bb' coated on the upper surface of the flat portion 235' or the island portion 237' of the island pattern PTN-2 of the color filter 230', and a thick film portion 180ba' coated on the upper surface of the first and second grooved portions 236-1' and 236-2' of the island pattern PTN-2 of the color filter 230'.

A second film thickness $T_C'$ of the thick film portion 180ba' may be larger than a first film thickness $T_c'$ of the thin film portion 180bb' by 0.5 to 2.5 μm. More particularly, by a step formed between the thin film portion 180bb' and the thick film portion 180ba' of the organic layer stripe pattern PTN-3, a step may be formed between a first or second spacer 221a' or 221b' and a light blocking member 222' even when the black column spacer 220' is formed with the full tone.

In the case, a thickness D1' of the first or second spacer 221a' or 221b' may be the same as a thickness D2' of the light blocking member 222'. A difference between the thickness D1' of the first or second spacer 221a' or 221b' and the thickness D2' of the light blocking member 222' is preferably 1.0 μm, by considering planarization of the light blocking area BA' and the first or second spacer 221a' or 221b', when the black column spacer 220' is formed along the gate line with the full tone.

Referring to FIG. 7, the color filter 230' material layer may have positive sensitivity that may disappear when the light is irradiated. An optical mask 50' for the color filter material layer may include a main region 55m', which is the opaque region corresponding to the flat portion 235' at the center of the pixel described above, and a half tone region 55n' corresponding to the light blocking region of the center. The half tone region 55n' may include a transparent region 55a' corresponding to first and second grooved portions 236_1' and 236_2' and an opaque region 55c' corresponding to the island portion 237'.

When the color filter material layer is exposed and formed through the optical mask 50', light may fully pass through the transparent region 55a' to form the first and second grooved portions 236_1' and 236_2', and light may not be transmitted through the opaque regions 55m' and 55c' such that the flat portion 235' and the island portion 237' at the center of the pixel may be formed.

A second insulating layer 180b' formed of an organic layer along the island pattern PTN-2 of the color filter 230' is formed by using a two-tone mask, that is, the half tone optical mask 50'. The optical mask 50' for the organic layer may include a main region 52m' which is a first half tone corresponding to the thin film portion 180bb' formed on the flat portion 235' or the island portion 237' of the color filter 230', and transparent regions 52a' and 52b' forming the thick film portion 180ba' filling the first and second grooved portions 236_1' and 236_2' of the island pattern PTN-2.

When the organic insulating layer is exposed and formed through the optical mask 50', light may fully pass through the transparent regions 52a' and 52b' to form the thick film portion 180ba', and the thin film portion 180bb' formed on the flat portion 235', and the island portion 237' at the center of the display area are formed through the main region 52m', which partially transmits the light.

The black column spacer material layer is coated along the organic stripe pattern PTN-3. The black column spacer 220' is integrally formed by the light blocking member 222' and the first or second spacer 221a' or 221b' in the light blocking area BA, and as a result, one mask for the light blocking member 222' and the first or second spacer 221a' or 221b' may be reduced, which may reduce one photoresist process and manufacturing costs and improve process efficiency.

The black column spacer 220' may form the pattern PTN-3 configured by the main region 57m' which is the opaque region, the opaque region 57a' corresponding to the light blocking member 222', and the opaque region 57b' corresponding to the first or second spacer 221a' or 221b' by using the full tone optical mask.

Accordingly, the half tone optical mask in the light blocking region of the black column spacer causing overdevelopment may not be used at the outer edge of the display area. Since the fully exposed black column spacer may not be sensitive to the concentration of the developer, the overdevelopment may not be caused at the outer edge of the display area.

More particularly, since the island pattern PNT_2 of the color filter 230' and the pattern PTN-3 of the second insulating layer 180b' are step-formed as a protruding pattern by using the full tone and half tone, even though the black column spacer 220' is formed thereon with the full tone, a step may be formed between the first or second spacer 221a' or 221b' and the light blocking member 222'.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A liquid crystal display, comprising:
   a first substrate comprising a light transmitting area and a light blocking area;
   a second substrate facing the first substrate;
   a liquid crystal layer disposed between the first substrate and the second substrate;
   a gate conductor configured to transfer gate signals and a data conductor configured to transfer data voltages, the gate conductor and the data conductor disposed on the first substrate;
   a thin film transistor comprising the gate conductor and the data conductor;
   a pixel electrode connected to the thin film transistor;
   a color filter disposed between the data conductor and the pixel electrode; and
   a black column spacer disposed on the color filter and overlapping the light blocking area,
   wherein:
   the color filter comprises a concave portion and a convex portion disposed in the concave portion wherein the concave portion has a thickness greater than 0; and
   the black column spacer overlaps the color filter and comprises a light blocking member overlapping the concave portion and a spacer overlapping the convex portion, the light blocking member and the spacer have substantially the same thickness as each other.

2. The liquid crystal display of claim 1, further comprising a shielding common electrode configured to be applied with the same common voltage as a common electrode disposed on the second substrate.

3. The liquid crystal display of claim 1, wherein:
   the color filter overlaps the light transmitting area and the light blocking area, and has first, second, and third thicknesses; and
   the first thickness of the color filter in the light transmitting area is different from the second and the third thicknesses of the color filter in the light blocking area, such that the first step comprises a stripe pattern.

4. The liquid crystal display of claim 3, wherein:
   the stripe pattern comprises the convex portion disposed in the light blocking area, first and second concave portions disposed around the convex portion, and a flat portion disposed in the light transmitting area.

5. The liquid crystal display of claim 4, wherein:
the convex portion is hemispherically rounded, and edges of the first and second concave portions and the flat portion are rounded.

6. The liquid crystal display of claim 4, wherein:
the third thickness of the color filter in the convex portion of the stripe pattern is greater than the second thickness of the color filter of the first and second concave portions by 0.5 to 2.5 μm.

7. The liquid crystal display of claim 4, wherein:
the third thickness of the color filter of the convex portion of the stripe pattern is substantially the same as the first thickness of the color filter of the flat portion in the light transmitting area.

8. The liquid crystal display of claim 7, wherein:
a difference between the third thickness of the color filter of the convex portion of the stripe pattern and the first thickness of the color filter of the flat portion in the light transmitting area is 1.0 μm or less.

* * * * *